(12) United States Patent
Dufford (10) Patent No.: US 10,166,966 B2
(45) Date of Patent: Jan. 1, 2019

(54) HYBRID VEHICLES AND METHODS FOR PROVIDING ELECTRICAL ENERGY TO MOTOR-GENERATORS

(71) Applicant: Toyota Motor Engineering & Manufacturing North America, Inc., Erlanger, KY (US)

(72) Inventor: Mohammad E. Dufford, Los Angeles, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 89 days.

(21) Appl. No.: 14/924,988

(22) Filed: Oct. 28, 2015

(65) Prior Publication Data

US 2017/0120740 A1    May 4, 2017

(51) Int. Cl.
*B60W 10/26* (2006.01)
*B60K 6/28* (2007.10)
*B60W 10/06* (2006.01)
*B60W 10/08* (2006.01)
(Continued)

(52) U.S. Cl.
CPC .............. *B60W 10/26* (2013.01); *B60K 6/28* (2013.01); *B60K 6/445* (2013.01); *B60W 10/06* (2013.01); *B60W 10/08* (2013.01); *B60W 20/10* (2013.01); *B60W 2510/0638* (2013.01); *B60W 2520/10* (2013.01); *B60W 2540/10* (2013.01); *B60W 2710/0644* (2013.01);
(Continued)

(58) Field of Classification Search
None
See application file for complete search history.

(56) References Cited

U.S. PATENT DOCUMENTS 5,934,395 A * 8/1999 Koide ................ B60W 10/06
                                              180/65.235
6,053,842 A * 4/2000 Kitada ................ B60W 10/26
                                              180/65.25
(Continued)

FOREIGN PATENT DOCUMENTS

| KR | 20140046166 A | 4/2014 |
|----|---------------|--------|
| WO | 2015032994 A1 | 3/2015 |
| WO | 2014056653 A1 | 4/2015 |

*Primary Examiner* — David P. Merlino
(74) *Attorney, Agent, or Firm* — Dinsmore & Shohl LLP (57) ABSTRACT

Hybrid vehicles and methods for providing electrical energy to motor-generators of hybrid vehicles are disclosed. A hybrid vehicle includes a first motor-generator comprising an output shaft mechanically coupled to a crankshaft of an internal combustion engine, a second motor-generator comprising an output shaft mechanically coupled to a plurality of drive wheels, a primary electrical energy storage device, and a secondary electrical energy storage device. The hybrid vehicle provides a first amount of electrical energy from the primary electrical energy storage device and the secondary electrical energy storage device to the first motor-generator in order to increase an engine speed of the internal combustion engine, and simultaneously provides a second amount of electrical energy from the primary electrical energy storage device and the secondary electrical energy storage device to the second motor-generator in order to increase a rotational speed of the plurality of drive wheels.

8 Claims, 3 Drawing Sheets

(51) Int. Cl.
*B60W 20/10* (2016.01)
*B60K 6/445* (2007.10)

(52) U.S. Cl.
CPC ... *B60W 2710/242* (2013.01); *B60W 2720/30* (2013.01); *B60Y 2200/92* (2013.01); *Y10S 903/93* (2013.01)

(56) References Cited

U.S. PATENT DOCUMENTS

| | | | |
|---|---|---|---|
| 6,190,283 B1 * | 2/2001 | Uchida | B60K 6/24 477/5 |
| 8,092,339 B2 | 1/2012 | Heap et al. | |
| 8,094,433 B2 | 1/2012 | Tian et al. | |
| 8,170,764 B2 | 5/2012 | Kaminsky et al. | |
| 8,761,978 B2 | 6/2014 | King | |
| 8,903,619 B2 | 12/2014 | Noumura et al. | |
| 8,909,386 B2 | 12/2014 | Takeuchi et al. | |
| 8,924,070 B2 | 12/2014 | Gibson et al. | |
| 9,000,614 B2 | 4/2015 | King et al. | |
| 9,014,919 B2 | 4/2015 | Kim | |
| 2001/0039230 A1 * | 11/2001 | Severinsky | B60K 6/22 477/3 |
| 2003/0222502 A1 | 12/2003 | Takahashi et al. | |
| 2004/0050598 A1 * | 3/2004 | Saito | B60W 10/06 180/65.225 |
| 2006/0012321 A1 * | 1/2006 | Rozman | F02C 7/275 318/432 |
| 2012/0004800 A1 | 1/2012 | Heinen | |
| 2014/0236441 A1 * | 8/2014 | Sato | B60K 6/365 701/64 |
| 2014/0339009 A1 * | 11/2014 | Suzuki | B60K 1/00 180/232 |
| 2015/0285161 A1 * | 10/2015 | Ulrey | B60W 10/06 180/65.28 |
| 2017/0012445 A1 * | 1/2017 | Takemura | H01M 10/425 |

* cited by examiner

HYBRID VEHICLES AND METHODS FOR PROVIDING ELECTRICAL ENERGY TO MOTOR-GENERATORS

TECHNICAL FIELD

The present specification generally relates to hybrid vehicles and electrical energy distribution in hybrid vehicles and, more specifically, to hybrid vehicles and methods for providing electrical energy to motor-generators of hybrid vehicles.

BACKGROUND

Hybrid vehicles typically include an internal combustion engine, an electrical energy source, and one or more motor-generators. In some operating modes, the one or more motor-generators may need to be powered by the electrical energy source.

Accordingly, a need exists for hybrid vehicles and methods for providing electrical energy to motor-generators.

SUMMARY

In one embodiment, a hybrid vehicle includes one or more processors, one or more memory modules communicatively coupled to the one or more processors, an internal combustion engine comprising a crankshaft, a plurality of drive wheels, a first motor-generator comprising an output shaft, a second motor-generator comprising an output shaft, a primary electrical energy storage device electrically coupled to the first motor-generator and the second motor-generator such that the primary electrical energy storage device can provide electrical energy to the first motor-generator and the second motor-generator, a secondary electrical energy storage device electrically coupled to the first motor-generator and the second motor-generator such that the secondary electrical energy storage device can provide electrical energy to the first motor-generator and the second motor-generator, and machine readable instructions stored in the one or more memory modules. The output shaft of the first motor-generator is mechanically coupled to the crankshaft of the internal combustion engine. The output shaft of the second motor-generator is mechanically coupled to the plurality of drive wheels. When executed by the one or more processors, the machine readable instructions cause the hybrid vehicle to provide a first amount of electrical energy from the primary electrical energy storage device and the secondary electrical energy storage device to the first motor-generator in order to increase an engine speed of the internal combustion engine, and provide a second amount of electrical energy from the primary electrical energy storage device and the secondary electrical energy storage device to the second motor-generator in order to increase a rotational speed of the plurality of drive wheels. The first amount of electrical energy is provided to the first motor-generator at the same time as the second amount of electrical energy is provided to the second motor-generator.

In another embodiment, a hybrid vehicle includes one or more processors, one or more memory modules communicatively coupled to the one or more processors, a mechanical power distribution apparatus, an internal combustion engine comprising a crankshaft, a plurality of drive wheels, a first motor-generator comprising an output shaft, a second motor-generator comprising an output shaft, a primary electrical energy storage device electrically coupled to the first motor-generator and the second motor-generator such that the primary electrical energy storage device can provide electrical energy to the first motor-generator and the second motor-generator, a secondary electrical energy storage device electrically coupled to the first motor-generator and the second motor-generator such that the secondary electrical energy storage device can provide electrical energy to the first motor-generator and the second motor-generator, and machine readable instructions stored in the one or more memory modules. The mechanical power distribution apparatus includes a sun gear, a plurality of planetary gears, a carrier, and a ring gear. The plurality of planetary gears mesh with the ring gear and the sun gear. The plurality of planetary gears are mechanically coupled to the carrier. The crankshaft of the internal combustion engine is mechanically coupled to the carrier of the mechanical power distribution apparatus. The output shaft of the first motor-generator is mechanically coupled to the sun gear of the mechanical power distribution apparatus. The output shaft of the second motor-generator is mechanically coupled to the plurality of drive wheels and is mechanically coupled to the ring gear of the mechanical power distribution apparatus. When executed by the one or more processors, the machine readable instructions cause the hybrid vehicle to determine a requested acceleration amount, determine a vehicle speed, provide a first amount of electrical energy from the primary electrical energy storage device and the secondary electrical energy storage device to the first motor-generator in order to increase an engine speed of the internal combustion engine, and provide a second amount of electrical energy from the primary electrical energy storage device and the secondary electrical energy storage device to the second motor-generator in order to increase a rotational speed of the plurality of drive wheels. The first amount of electrical energy is based on the requested acceleration amount and the vehicle speed. The second amount of electrical energy is based on the requested acceleration amount and the vehicle speed. The first amount of electrical energy is provided to the first motor-generator at the same time as the second amount of electrical energy is provided to the second motor-generator.

In yet another embodiment, a method for providing electrical energy from a primary electrical energy storage device and a secondary electrical energy storage device to a first motor-generator and a second motor-generator of a hybrid vehicle includes determining a requested acceleration amount, determining a vehicle speed, determining a first amount of electrical energy to provide to the first motor-generator based on the requested acceleration amount and the vehicle speed, determining a second amount of electrical energy to provide to the second motor-generator based on the requested acceleration amount and the vehicle speed, providing the first amount of electrical energy from the primary electrical energy storage device and the secondary electrical energy storage device to the first motor-generator in order to increase an engine speed of the internal combustion engine, and providing the second amount of electrical energy from the primary electrical energy storage device and the secondary electrical energy storage device to the second motor-generator in order to increase a rotational speed of the plurality of drive wheels. The first amount of electrical energy is provided to the first motor-generator at the same time as the second amount of electrical energy is provided to the second motor-generator.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
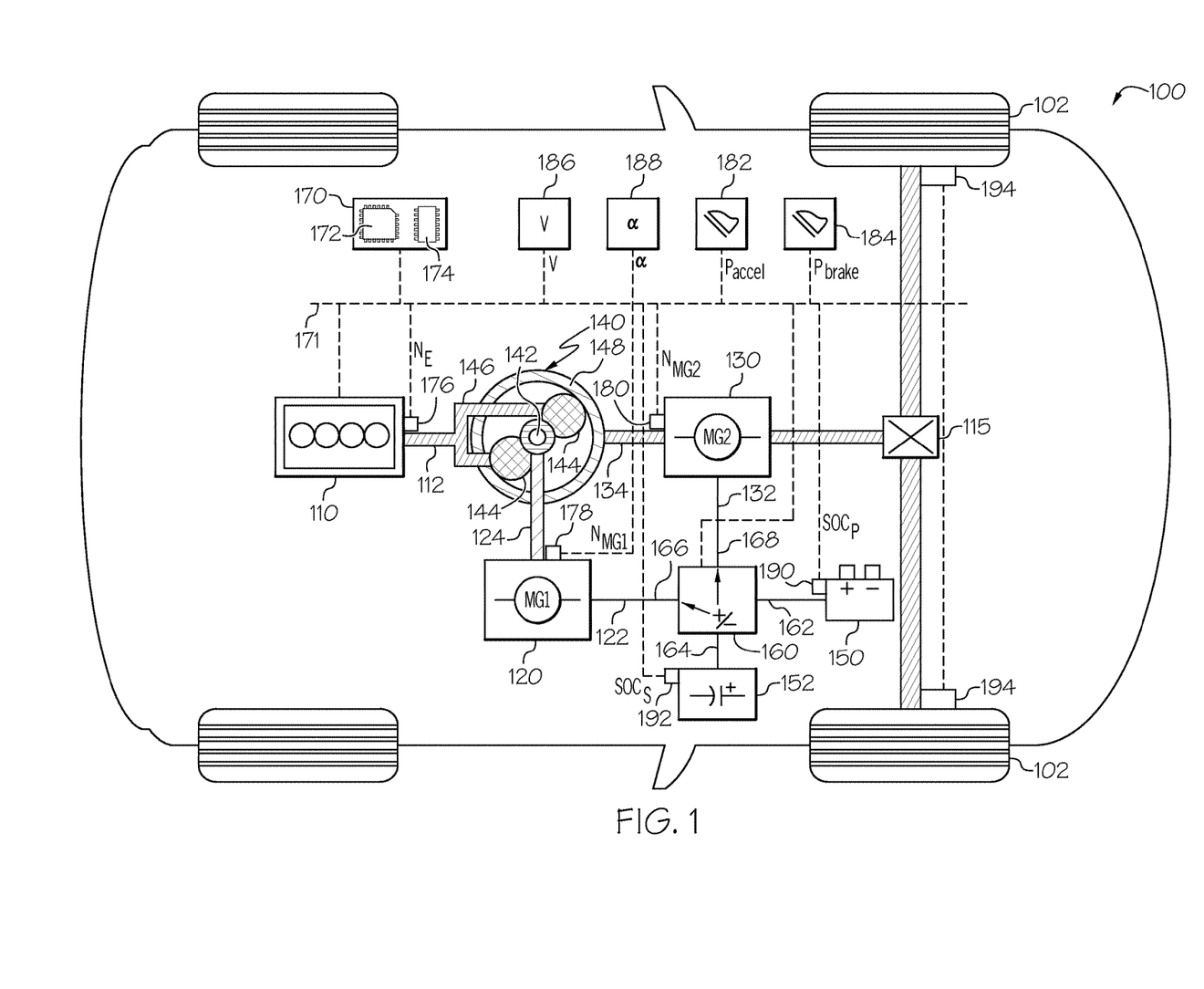
FIG. 1 schematically depicts a hybrid vehicle including a first motor-generator, a second motor-generator, a primary electrical energy storage device, and a secondary electrical energy storage device, according to one or more embodiments shown and described herein.

The embodiments disclosed herein include hybrid vehicles and methods for providing electrical energy to motor-generators. Referring generally to FIG. 1, a hybrid vehicle includes an internal combustion engine comprising a crankshaft, a plurality of drive wheels, a first motor-generator comprising an output shaft that is mechanically coupled to the crankshaft of the internal combustion engine, a second motor-generator comprising an output shaft that is mechanically coupled to the plurality of drive wheels, a primary electrical energy storage device electrically coupled to the first motor-generator and the second motor-generator, and a secondary electrical energy storage device electrically coupled to the first motor-generator and the second motor-generator. The hybrid vehicle provides a first amount of electrical energy from the primary electrical energy storage device and the secondary electrical energy storage device to the first motor-generator in order to increase an engine speed of the internal combustion engine, and simultaneously provides a second amount of electrical energy from the primary electrical energy storage device and the secondary electrical energy storage device to the second motor-generator in order to increase a rotational speed of the plurality of drive wheels. Such hybrid vehicles are able to simultaneously provide sufficient electrical energy to the first motor-generator in order to increase the engine speed of the internal combustion engine at an acceptable rate while providing sufficient electrical energy to the second motor-generator in order to increase a rotational speed of the plurality of drive wheels at a sufficient rate to manage acceleration events. Furthermore, the hybrid vehicles described herein are able to adjust the amount of electrical energy distributed from the primary electrical energy storage device and the secondary electrical energy storage device to the first motor-generator and the second motor-generator based on a requested acceleration amount and a vehicle speed, thereby allowing the hybrid vehicle to flexibly tailor the distribution of electrical energy used to increase a rotational speed of the internal combustion engine and used to increase a rotational speed of the plurality of drive wheels based on particular requested acceleration and speed conditions. The various hybrid vehicles and methods for providing electrical energy to motor-generators will be described in more detail herein with specific reference to the corresponding drawings.

Referring now to FIG. 1, an embodiment of a hybrid vehicle 100 is schematically depicted. The hybrid vehicle 100 includes a plurality of drive wheels 102, a differential gear 115, an internal combustion engine 110, a first motor-generator 120, a second motor-generator 130, a mechanical power distribution apparatus 140, a primary electrical energy storage device 150, a secondary electrical energy storage device 152, an electrical energy distribution device 160, an electronic control unit 170, a communication path 171, and a number of sensors configured to sense a number of parameters associated with the operation of the hybrid vehicle 100. The various components of the hybrid vehicle 100 will now be described.

Still referring to FIG. 1, the internal combustion engine 110 converts thermal energy released by controlled combustion of fuel into mechanical energy, which may be used by the hybrid vehicle 100 for a number of purposes, such as to rotate the plurality of drive wheels 102 of the hybrid vehicle 100. In some embodiments, the fuel combusted by the internal combustion engine 110 is gasoline or diesel oil. In some embodiments, the fuel combusted by the internal combustion engine 110 may be another type of fuel, such as propane, natural gas, ethanol, biodiesel, hydrogen, or any other fuel that may be combusted within the internal combustion engine 110 to produce thermal energy that may be converted into mechanical energy usable by the hybrid vehicle 100. The internal combustion engine 110 includes a crankshaft 112 that is caused to rotate by the combustion of the fuel within the internal combustion engine 110. In some embodiments, the crankshaft 112 converts reciprocating motion of one or more pistons driven by combustion of fuel within one or more cylinders.

Still referring to FIG. 1, the first motor-generator 120 is a machine that converts between electrical energy and mechanical energy. The first motor-generator 120 includes an electrical energy port 122 and an output shaft 124. The first motor-generator 120 is capable of operating in a motor mode and in a generator mode. When the first motor-generator 120 operates in the motor mode, electrical energy is received at the electrical energy port 122 and converted to mechanical energy when the output shaft 124 rotates in response to the electrical energy received at the electrical energy port 122. When the first motor-generator 120 operates in the generator mode, mechanical energy is received at the output shaft 124, the mechanical energy received at the output shaft 124 causes the output shaft 124 to rotate, and the mechanical energy of the rotating output shaft 124 is converted to electrical energy that is output at the electrical energy port 122. In the embodiment depicted in FIG. 1, the first motor-generator 120 is a synchronous motor-generator that, when operating in the motor mode, is driven by alternating current. When the first motor-generator 120 is driven by alternating current, the rotation of the output shaft 124 is synchronized with the frequency of the alternating current received at the electrical energy port 122. In other embodiments, the first motor-generator 120 is not a synchronous motor-generator, such as embodiments in which the first motor-generator 120 is an induction motor-generator.

Still referring to FIG. 1, the second motor-generator 130 is a machine that converts between electrical energy and mechanical energy. The second motor-generator 130 includes an electrical energy port 132 and an output shaft 134. The second motor-generator 130 is capable of operating in a motor mode and in a generator mode. When the second motor-generator 130 operates in the motor mode, electrical energy is received at the electrical energy port 132 and converted to mechanical energy when the output shaft 134 rotates in response to the electrical energy received at the electrical energy port 132. When the second motor-generator 130 operates in the generator mode, mechanical energy is received at the output shaft 134, the mechanical energy received at the output shaft 134 causes the output shaft 134 to rotate, and the mechanical energy of the rotating output shaft 134 is converted to electrical energy that is output at the electrical energy port 132. In the embodiment depicted in FIG. 1, the second motor-generator 130 is a synchronous motor-generator that, when operating in the motor mode, is driven by alternating current. When the second motor-generator 130 is driven by alternating current, the rotation of the output shaft 134 is synchronized with the frequency of the alternating current received at the electrical energy port 132. In other embodiments, the second motor-generator 130 is not a synchronous motor-generator, such as embodiments in which the second motor-generator 130 is an induction motor-generator.

Still referring to FIG. 1, the mechanical power distribution apparatus 140 includes a sun gear 142, a plurality of planetary gears 144, a carrier 146, and a ring gear 148. The plurality of planetary gears 144 meshes with the sun gear 142 such that the plurality of planetary gears 144 and the sun gear 142 may rotate relative to one another. The plurality of planetary gears 144 also meshes with the ring gear 148 such that the plurality of planetary gears 144 and the ring gear 148 may rotate relative to one another. The plurality of planetary gears 144 is mechanically coupled to the carrier 146 such that the carrier 146 rotates as the plurality of planetary gears 144 rotate relative to the sun gear 142 or the ring gear 148.

Still referring to the mechanical power distribution apparatus 140 depicted in FIG. 1, the sun gear 142 is mechanically coupled to the output shaft 124 of the first motor-generator 120 such that a rotational speed of the sun gear 142 is proportional to a rotational speed of the output shaft 124 of the first motor-generator 120. In some embodiments, the rotational speed of the sun gear 142 is the same as the rotational speed of the output shaft 124 of the first motor-generator 120, though embodiments are not limited thereto.

Still referring to the mechanical power distribution apparatus 140 depicted in FIG. 1, the plurality of planetary gears 144 are mechanically coupled to the carrier 146, which in turn is mechanically coupled to the crankshaft 112 of the internal combustion engine 110 such that a rotational speed of the crankshaft 112 of the internal combustion engine 110 is proportional to a rotational speed of the carrier 146. In some embodiments, the rotational speed of the crankshaft 112 of the internal combustion engine 110 is the same as the rotational speed of the carrier 146, though embodiments are not limited thereto.

Still referring to the mechanical power distribution apparatus 140 depicted in FIG. 1, the ring gear 148 is mechanically coupled to the output shaft 134 of the second motor-generator 130 such that a rotational speed of the output shaft 134 of the second motor-generator 130 is proportional to a rotational speed of the ring gear 148. In some embodiments, the rotational speed of the ring gear 148 is the same as the rotational speed of the output shaft 134 of the second motor-generator 130, though embodiments are not limited thereto. The output shaft 134 of the second motor-generator 130 is also mechanically coupled to a plurality of drive wheels 102 such that a rotational speed of the output shaft 134 of the second motor-generator 130 is proportional to a rotational speed of the plurality of drive wheels 102. Accordingly, the rotational speed of the plurality of drive wheels 102, the rotational speed of the output shaft 134 of the second motor-generator 130 and the rotational speed of the ring gear 148 are all proportional to one another. In the embodiment depicted in FIG. 1, the output shaft 134 of the second motor-generator 130 is mechanically coupled to a differential gear 115, which in turn is mechanically coupled to the plurality of drive wheels 102, though in other embodiments the output shaft 134 of the second motor-generator 130 may be mechanically coupled to the plurality of drive wheels 102 in another manner. Some embodiments may include additional components in the drive train of the hybrid vehicle 100. For example, some embodiments may include a flywheel and/or a damper mechanically coupled to the crankshaft of the internal combustion engine 110.

Still referring to FIG. 1, the primary electrical energy storage device 150 stores electrical energy that may be provided to various components of the hybrid vehicle 100, including the first motor-generator 120 and the second motor-generator 130. In some embodiments, the primary electrical energy storage device 150 includes one or more batteries, such as lithium-ion batteries. In some embodiments, the primary electrical energy storage device 150 includes one or more capacitors, such as high capacity capacitors (sometimes referred to as "supercapacitors" or "ultracapacitors").

Still referring to FIG. 1, the secondary electrical energy storage device 152 stores electrical energy that may be provided to various components of the hybrid vehicle 100, including the first motor-generator 120 and the second motor-generator 130. In some embodiments, the secondary electrical energy storage device 152 includes one or more high capacity capacitors (sometimes referred to as "supercapacitors" or "ultracapacitors"). In some embodiments, the secondary electrical energy storage device 152 includes one or more batteries, such as lithium-ion batteries.

Still referring to FIG. 1, the electrical energy distribution device 160 includes a first electrical energy port 162, a second electrical energy port 164, a third electrical energy port 166, and a fourth electrical energy port 168. The first electrical energy port 162 of the electrical energy distribution device 160 is electrically coupled to the primary electrical energy storage device 150. The second electrical energy port 164 of the electrical energy distribution device 160 is electrically coupled to the secondary electrical energy storage device 152. The third electrical energy port 166 of the electrical energy distribution device 160 is electrically coupled to the electrical energy port 122 of the first motor-generator 120. The fourth electrical energy port 168 of the electrical energy distribution device 160 is electrically coupled to the electrical energy port 132 of the second motor-generator 130. As will be more fully described below, the electrical energy distribution device 160 distributes electrical energy from the primary electrical energy storage device 150 and/or the secondary electrical energy storage device 152 to the first motor-generator 120 and/or the second motor-generator 130 (e.g., when the first motor-generator 120 and/or the second motor-generator 130 operate in the motor mode), as well as distributes electrical energy from the first motor-generator 120 and the second motor-generator 130 to the primary electrical energy storage device 150 and the secondary electrical energy storage device 152 (e.g., when the first motor-generator 120 and/or the second motor-generator 130 operate in the generator mode).

Figure 2:
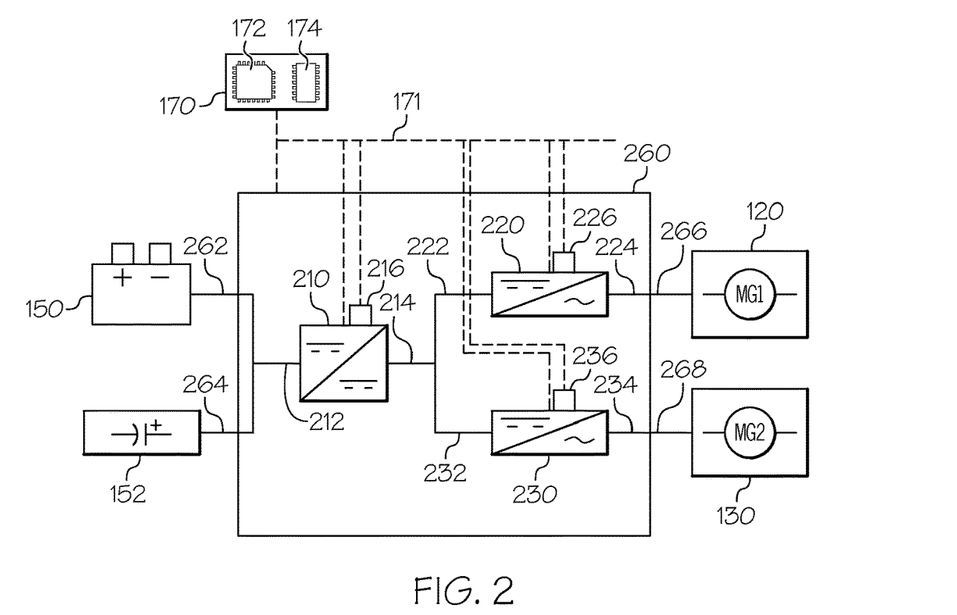
FIG. 2 schematically depicts an electrical energy distribution device comprising a common DC-DC converter, a first inverter, and a second inverter, according to one or more embodiments shown and described herein.
Figure 3:
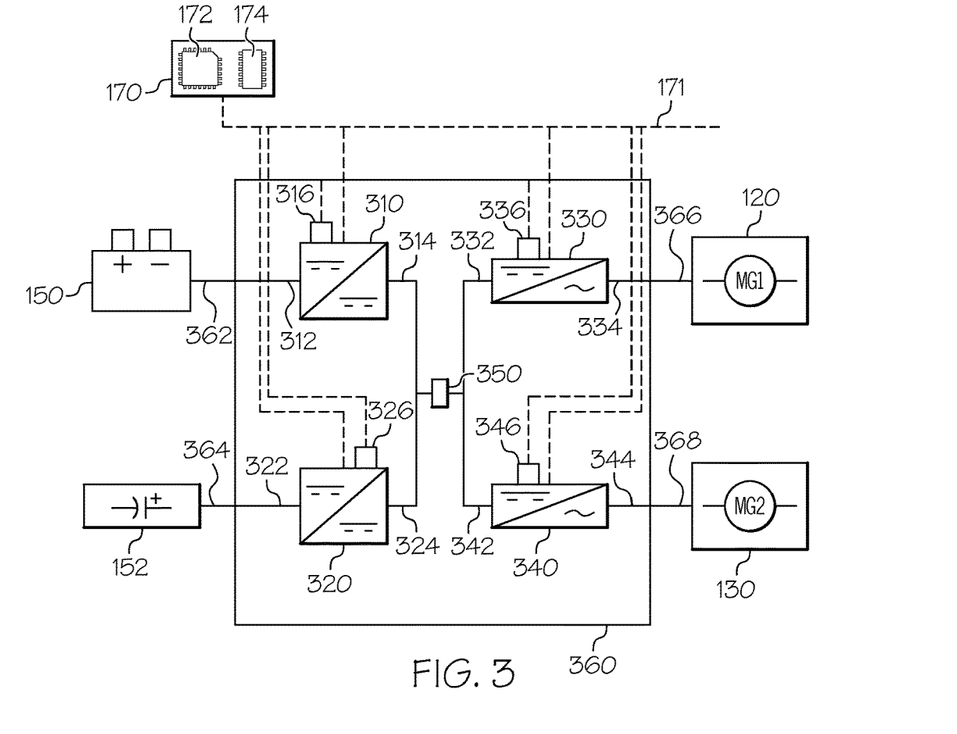
FIG. 3 schematically depicts an electrical energy distribution device comprising a first DC-DC converter, a second DC-DC converter, a first inverter, and a second inverter, according to one or more embodiments shown and described herein.

Still referring to the electrical energy distribution device 160 of FIG. 1, in some embodiments, the electrical energy distribution device 160 includes one or more DC-DC converters that outputs electrical energy at a voltage different from a voltage of electrical energy received by the DC-DC converter. In some embodiments, the electrical energy distribution device 160 includes one or more inverters for converting between direct current and alternating current, such as then when one or more inverters converts between direct current received by the electrical energy distribution device and alternating current output by the electrical energy distribution device, or vice-versa. FIGS. 2 and 3, described in detail below, depict two possible embodiments of such electrical energy distribution devices that include DC-DC converters and inverters.

Referring now to FIG. 2, an electrical energy distribution device 260 is schematically depicted. In some embodiments, the electrical energy distribution device 160 of FIG. 1 is the electrical energy distribution device 260 depicted in FIG. 2. The electrical energy distribution device 260 depicted in FIG. 2 includes a first electrical energy port 262, a second electrical energy port 264, a third electrical energy port 266, a fourth electrical energy port 268, a common DC-DC converter 210, a first inverter 220, a second inverter 230, a common DC-DC converter current sensor 216, a first inverter current sensor 226, and a second inverter current sensor 236. The first electrical energy port 262 of the electrical energy distribution device 260 is electrically coupled to the primary electrical energy storage device 150. The second electrical energy port 264 of the electrical energy distribution device 160 is electrically coupled to the secondary electrical energy storage device 152. The third electrical energy port 266 of the electrical energy distribution device 260 is electrically coupled to the electrical energy port of the first motor-generator 120. The fourth electrical energy port 268 of the electrical energy distribution device 260 is electrically coupled to the electrical energy port of the second motor-generator 130.

Still referring to the electrical energy distribution device 260 depicted in FIG. 2, the first electrical energy port 262 and the second electrical energy port 264 of the electrical energy distribution device 260 are electrically coupled to a first electrical energy port 212 of the common DC-DC converter 210, thereby electrically coupling the common DC-DC converter 210 to the primary electrical energy storage device 150 and the secondary electrical energy storage device 152. The common DC-DC converter 210 converts voltage such that a voltage at the first electrical energy port 212 of the common DC-DC converter 210 is different than a voltage at the second electrical energy port 214 of the common DC-DC converter 210. For example, in some embodiments, a voltage at the first electrical energy port 212 may be lower than a voltage at the second electrical energy port 214. The common DC-DC converter current sensor 216 is communicatively coupled to the electronic control unit 170, is coupled to the common DC-DC converter 210, and is operable to sense an amount of current flowing through the common DC-DC converter 210. In some embodiments, the common DC-DC converter current sensor 216 is a hall effect current sensor, though embodiments are not limited thereto.

Still referring to FIG. 2, the second electrical energy port 214 of the common DC-DC converter 210 is electrically coupled to a first electrical energy port 222 of the first inverter 220 and electrically coupled to a first electrical energy port 232 of the second inverter 230, thereby electrically coupling the common DC-DC converter 210 to both the first inverter 220 and second inverter 230. A second electrical energy port 224 of the first inverter 220 is electrically coupled to the electrical energy port of the first motor-generator 120, thereby electrically coupling the first inverter 220 to the first motor-generator 120. A second electrical energy port 234 of the second inverter 230 is electrically coupled to the electrical energy port of the second motor-generator 130, thereby electrically coupling the second inverter 230 to the second motor-generator 130. The first inverter 220 converts between direct current at the first electrical energy port 222 and alternating current at the second electrical energy port 224. The second inverter 230 converts between direct current at the first electrical energy port 232 and alternating current at the second electrical energy port 234. The first inverter current sensor 226 is communicatively coupled to the electronic control unit 170, is coupled to the first inverter 220, and is operable to sense an amount of current flowing through the first inverter 220 (e.g., an amount of current being provided to or received from the first motor-generator 120). The second inverter current sensor 236 is communicatively coupled to the electronic control unit 170, is coupled to the second inverter 230, and is operable to sense an amount of current flowing through the second inverter 230 (e.g., an amount of current being provided to or received from the second motor-generator 130). In some embodiments, the first inverter current sensor 226 and the second inverter current sensor 236 are hall effect current sensors, though embodiments are not limited thereto.

Still referring to FIG. 2, each of the common DC-DC converter 210, the first inverter 220, and the second inverter 230 are communicatively coupled to the electronic control unit 170 via the communication path 171. Machine readable instructions stored in the one or more memory modules 174 of the electronic control unit 170, when executed by the one or more processors 172 of the electronic control unit 170, cause command signals to be provided to the common DC-DC converter 210, the first inverter 220, and the second inverter 230 (e.g., command signals to control one or more power transistors included in each of the common DC-DC converter 210, the first inverter 220, and the second inverter 230) to control the distribution of power among the primary electrical energy storage device 150, the secondary electrical energy storage device 152, the first motor-generator 120, and the second motor-generator 130. In particular, in some embodiments in which the first motor-generator 120 and the second motor-generator 130 operate in the motor mode, the common DC-DC converter 210 steps up the voltage of the direct current electrical energy received from the primary electrical energy storage device 150 and the secondary electrical energy storage device 152 into a higher voltage direct current output, and each of the first inverter 220 and the second inverter 230 converts the higher voltage direct current output of the common DC-DC converter 210 to alternating current for driving the first motor-generator 120 and the second motor-generator 130. Conversely, in some embodiments in which the first motor-generator 120 and the second motor-generator 130 operate in the generator mode, each of the first inverter 220 and the second inverter 230 convert alternating current received from the first motor-generator 120 and the second motor-generator 130 into a direct current output, and the common DC-DC converter 210 converts the direct current output by the first inverter 220 and the second inverter 230 into lower voltage direct current electrical energy that may be channeled to the primary electrical energy storage device 150 and the secondary electrical energy storage device 152 for storage and later use.

While the common DC-DC converter 210 is described above as having a higher voltage at the first electrical energy port 212 than at the second electrical energy port 214, in other embodiments, the common DC-DC converter 210 has a lower voltage at the first electrical energy port 212 than at the second electrical energy port 214. Furthermore, some embodiments of the electrical energy distribution device 260 do not include the common DC-DC converter 210, such as embodiments in which the primary electrical energy storage device 150 is electrically coupled to the first inverter 220 without an intermediary DC-DC converter and the secondary electrical energy storage device 152 is electrically coupled to the second inverter 230 without an intermediary DC-DC converter. Furthermore, some embodiments do not include the first inverter 220 and/or the second inverter 230, such as embodiments in which the first motor-generator 120 and the second motor-generator 130 are induction motor-generators driven by direct current. Furthermore, some embodiments of the electrical energy distribution device 260 may not include any DC-DC converters or inverters, such as embodiments in which the first motor-generator 120 and the second motor-generator 130 are induction motors driven by direct current having the same voltage as the primary electrical energy storage device 150 and the secondary electrical energy storage device 152.

Referring now to FIG. 3, an electrical energy distribution device 360 is schematically depicted. In some embodiments, the electrical energy distribution device 160 of FIG. 1 is the electrical energy distribution device 360 depicted in FIG. 3. The electrical energy distribution device 360 depicted in FIG. 3 includes a first electrical energy port 362, a second electrical energy port 364, a third electrical energy port 366, a fourth electrical energy port 368, a first DC-DC converter 310, a second DC-DC converter 320, a first inverter 330, a second inverter 340, a first DC-DC converter current sensor 316, a second DC-DC converter current sensor 326, a first inverter current sensor 336, and a second inverter current sensor 346. The first electrical energy port 362 of the electrical energy distribution device 360 is electrically coupled to the primary electrical energy storage device 150. The second electrical energy port 364 of the electrical energy distribution device 160 is electrically coupled to the secondary electrical energy storage device 152. The third electrical energy port 366 of the electrical energy distribution device 360 is electrically coupled to the electrical energy port of the first motor-generator 120. The fourth electrical energy port 368 of the electrical energy distribution device 360 is electrically coupled to the electrical energy port of the second motor-generator 130.

Still referring to the electrical energy distribution device 360 depicted in FIG. 3, the first electrical energy port 362 is electrically coupled to a first electrical energy port 312 of the first DC-DC converter 310, thereby electrically coupling the first DC-DC converter 310 to the primary electrical energy storage device 150. The first DC-DC converter 310 converts voltage such that a voltage at the first electrical energy port 312 of the first DC-DC converter 310 is different than a voltage at the second electrical energy port 314 of the first DC-DC converter 310. For example, in some embodiments, a voltage at the first electrical energy port 312 may be lower than a voltage at the second electrical energy port 314. The first DC-DC converter current sensor 316 is communicatively coupled to the electronic control unit 170, is coupled to the first DC-DC converter 310, and is operable to sense an amount of current flowing through the first DC-DC converter 310. In some embodiments, the first DC-DC converter current sensor 316 is a hall effect current sensor, though embodiments are not limited thereto.

Still referring to the electrical energy distribution device 360 depicted in FIG. 3, the second electrical energy port 364 is electrically coupled to a first electrical energy port 322 of the second DC-DC converter 320, thereby electrically coupling the second DC-DC converter 320 to the secondary electrical energy storage device 152. The second DC-DC converter 320 converts voltage such that a voltage at the first electrical energy port 322 of the second DC-DC converter 320 is different than a voltage at the second electrical energy port 324 of the second DC-DC converter 320. For example, in some embodiments, a voltage at the first electrical energy port 322 may be lower than a voltage at the second electrical energy port 324. The second DC-DC converter current sensor 326 is communicatively coupled to the electronic control unit 170, is coupled to the second DC-DC converter 320, and is operable to sense an amount of current flowing through the second DC-DC converter 320. In some embodiments, the second DC-DC converter current sensor 326 is a hall effect current sensor, though embodiments are not limited thereto.

Still referring to FIG. 3, the second electrical energy port 314 of the first DC-DC converter 310 and the second electrical energy port 324 of the second DC-DC converter 320 are electrically coupled to a DC power bus 350, which in turn is electrically coupled to a first electrical energy port 332 of the first inverter 330 and a first electrical energy port 342 of the second inverter 340, thereby electrically coupling the first DC-DC converter 310 and the second DC-DC converter 320 to the first inverter 330 and second inverter 340. A second electrical energy port 334 of the first inverter 330 is electrically coupled to the electrical energy port of the first motor-generator 120, thereby electrically coupling the first inverter 330 to the first motor-generator 120. A second electrical energy port 344 of the second inverter 340 is electrically coupled to the electrical energy port of the second motor-generator 130, thereby electrically coupling the second inverter 340 to the second motor-generator 130. The first inverter 330 converts between direct current at the first electrical energy port 332 and alternating current at the second electrical energy port 334. The second inverter 340 converts between direct current at the first electrical energy port 342 and alternating current at the second electrical energy port 344. The first inverter current sensor 336 is communicatively coupled to the electronic control unit 170, is coupled to the first inverter 330, and is operable to sense an amount of current flowing through the first inverter 330 (e.g., an amount of current being provided to or received from the first motor-generator 120). The second inverter current sensor 346 is communicatively coupled to the electronic control unit 170, is coupled to the second inverter 340, and is operable to sense an amount of current flowing through the second inverter 340 (e.g., an amount of current being provided to or received from the second motor-generator 130). In some embodiments, the first inverter current sensor 336 and the second inverter current sensor 346 are hall effect current sensors, though embodiments are not limited thereto.

Still referring to FIG. 3, each of the first DC-DC converter 310, the second DC-DC converter 320, the first inverter 330, and the second inverter 340 are communicatively coupled to the electronic control unit 170 via the communication path 171. Machine readable instructions stored in the one or more memory modules 174 of the electronic control unit 170, when executed by the one or more processors 172 of the electronic control unit 170, cause command signals to be provided to the first DC-DC converter 310, the second DC-DC converter 320, the first inverter 330, and the second inverter 340 (e.g., command signals to control one or more power transistors included in each of the first DC-DC converter 310, the second DC-DC converter 320, the first inverter 330, and the second inverter 340) to control the distribution of power among the primary electrical energy storage device 150, the secondary electrical energy storage device 152, the first motor-generator 120, and the second motor-generator 130. In particular, in some embodiments in which the first motor-generator 120 and the second motor-generator 130 operate in the motor mode, the first DC-DC converter 310 and the second DC-DC converter 320 step up the voltage of the direct current electrical energy respectively received from the primary electrical energy storage device 150 and the secondary electrical energy storage device 152 into a higher voltage direct current output to the DC power bus 350, and each of the first inverter 330 and the second inverter 340 converts the higher voltage direct current output on the DC power bus 350 to alternating current for driving the first motor-generator 120 and the second motor-generator 130. Conversely, in some embodiments in which the first motor-generator 120 and the second motor-generator 130 operate in the generator mode, each of the first inverter 330 and the second inverter 340 convert alternating current respectively received from the first motor-generator 120 and the second motor-generator 130 into a direct current output to the DC power bus 350, and the first DC-DC converter 310 and the second DC-DC converter 320 convert the direct current output from the DC power bus 350 into lower voltage direct current electrical energy that may be channeled to the primary electrical energy storage device 150 and the secondary electrical energy storage device 152 for storage and later use.

While the first DC-DC converter 310 and the second DC-DC converter 320 are described above as having a higher voltage at their first electrical energy ports than at their second electrical energy ports, in other embodiments, the first DC-DC converter 310 and the second DC-DC converter 320 have a lower voltage at their first electrical energy ports than at their second electrical energy ports. Furthermore, some embodiments of the electrical energy distribution device 360 do not include the first DC-DC converter 310 and/or the second DC-DC converter 320, such as embodiments in which the primary electrical energy storage device 150 is electrically coupled to the first inverter 330 without an intermediary DC-DC converter and the secondary electrical energy storage device 152 is electrically coupled to the second inverter 340 without an intermediary DC-DC converter. Furthermore, some embodiments do not include the first inverter 330 and/or the second inverter 340, such as embodiments in which the first motor-generator 120 and the second motor-generator 130 are induction motor-generators driven by direct current. Furthermore, some embodiments of the electrical energy distribution device 360 may not include any DC-DC converters or inverters, such as embodiments in which the first motor-generator 120 and the second motor-generator 130 are induction motors driven by direct current having the same voltage as the primary electrical energy storage device 150 and the secondary electrical energy storage device 152.

While particular examples of electrical energy distribution devices were depicted and described with reference to FIGS. 2 and 3, it should be understood that in other embodiments, the electrical energy distribution device 160 of FIG. 1 may include additional or fewer components or components arranged differently than the electrical energy distribution devices depicted in FIGS. 2 and 3.

Referring once again to FIG. 1, the communication path 171 communicatively couples a number of the electronic components of the hybrid vehicle 100. In particular, the communication path 171 communicatively couples the electronic control unit 170, the internal combustion engine 110, the electrical energy distribution device 160, an engine rotational speed sensor 176, a first motor-generator rotational speed sensor 178, a second motor-generator rotational speed sensor 180, an accelerator pedal position sensor 182, a brake pedal position sensor 184, a vehicle speed sensor 186, a vehicle acceleration sensor 188, a primary electrical energy storage device state of charge sensor 190, a secondary electrical energy storage device stage of charge sensor 192, and a plurality of wheel speed sensors 194.

Still referring to FIG. 1, the communication path 171 may be formed from any medium that is capable of transmitting a signal such as, for example, conductive wires, conductive traces, optical waveguides, or the like. Moreover, the communication path 171 may be formed from a combination of mediums capable of transmitting signals. In some embodiments, the communication path 171 comprises a combination of conductive traces, conductive wires, connectors, and buses that cooperate to permit the transmission of electrical data signals to components such as processors, memories, sensors, input devices, output devices, and communication devices. Accordingly, the communication path 171 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 171 communicatively couples the various components of the hybrid vehicle 100. As used herein, the term "communicatively coupled" means that coupled components are capable of exchanging data signals with one another such as, for example, electrical signals via conductive medium, electromagnetic signals via air, optical signals via optical waveguides, and the like.

Still referring to FIG. 1, the electronic control unit 170 includes one or more processors 172 and one or more memory modules 174 communicatively coupled to the one or more processors 172. Each of the one or more processors 172 of the electronic control unit 170 may be any device capable of executing machine readable instructions. Accordingly, each of the one or more processors 172 may be a controller, an integrated circuit, a microchip, a computer, or any other computing device. The one or more processors 172 are communicatively coupled to the other components of the hybrid vehicle 100 by the communication path 171. Accordingly, the communication path 171 may communicatively couple any number of processors with one another, and allow the components coupled to the communication path 171 to operate in a distributed computing environment. Specifically, each of the components may operate as a node that may send and/or receive data.

Each of the one or more memory modules 174 of the hybrid vehicle 100 is coupled to the communication path 171 and communicatively coupled to the one or more processors 172. The one or more memory modules 174 may comprise RAM, ROM, flash memories, hard drives, non-transitory storage media, or any device capable of storing machine readable instructions such that the machine readable instructions can be accessed and executed by the one or more processors 172. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 174. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

As noted above, the hybrid vehicle 100 includes a number of sensors, including the engine rotational speed sensor 176, the first motor-generator rotational speed sensor 178, the second motor-generator rotational speed sensor 180, the accelerator pedal position sensor 182, the brake pedal position sensor 184, the vehicle speed sensor 186, the vehicle acceleration sensor 188, the primary electrical energy storage device state of charge sensor 190, the secondary electrical energy storage device stage of charge sensor 192, and the plurality of wheel speed sensors 194. The engine rotational speed sensor 176 outputs an engine rotational speed signal (NE) indicative of a rotational speed of the crankshaft 112 of the internal combustion engine 110. The first motor-generator rotational speed sensor 178 outputs a first motor-generator rotational speed signal ($N_{MG1}$) indicative of a rotational speed of the output shaft 124 of the first motor-generator 120. The second motor-generator rotational speed sensor 180 outputs a second motor-generator rotational speed signal ($N_{MG2}$) indicative of a rotational speed of the output shaft 134 of the second motor-generator 130. The accelerator pedal position sensor 182 outputs an accelerator pedal position signal ($P_{accel}$) indicative of a position of an accelerator pedal of the hybrid vehicle 100. The brake pedal position sensor 184 outputs a brake pedal position signal ($P_{brake}$) indicative of a position of a brake pedal of the hybrid vehicle 100. The vehicle speed sensor 186 outputs a speed signal (v) indicative of a speed of the hybrid vehicle 100. The vehicle acceleration sensor 188 outputs an acceleration signal (a) indicative of an acceleration of the hybrid vehicle 100. The primary electrical energy storage device state of charge sensor 190 outputs a state of charge signal ($SOC_p$) indicative of a state of charge of the primary electrical energy storage device 150. The secondary electrical energy storage device state of charge sensor 192 outputs a state of charge signal ($SOC_s$) indicative of a state of charge of the secondary electrical energy storage device 152. Each of the plurality of wheel speed sensors 194 is associated with a corresponding one of the plurality of drive wheels 102. Each of the plurality of wheel speed sensors 194 outputs a wheel speed signal indicative of a wheel speed of the corresponding drive wheel of the plurality of drive wheels 102. In some embodiments, the hybrid vehicle 100 may not include one or more of the sensors depicted in FIG. 1 and/or may include sensors other than the sensors depicted in FIG. 1.

Having described the various components of the hybrid vehicle 100, methods of distributing electrical energy from the primary electrical energy storage device 150 and the secondary electrical energy storage device 152 to the first motor-generator 120 and the second motor-generator 130 will now be described.

Figure 4:
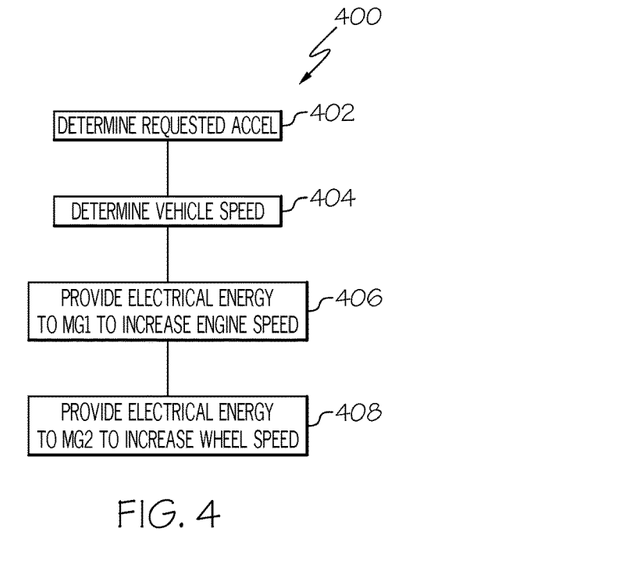
FIG. 4 schematically depicts a method for providing electrical energy to a first motor-generator and a second motor-generator, according to one or more embodiments shown and described herein.

Referring now to FIG. 4 in conjunction with FIG. 1, a method 400 is schematically depicted. Although the steps associated with the blocks of FIG. 4 will be described as being separate tasks, in other embodiments, the blocks may be combined or omitted. Further, while the steps associated with the blocks of FIG. 4 will be described as being performed in a particular order, in other embodiments, the steps may be performed in a different order.

At block 402, the machine readable instructions stored in the one or more memory modules 174, when executed by the one or more processors 172, cause the electronic control unit 170 to determine a requested acceleration amount. In some embodiments, the requested acceleration amount is determined based on the accelerator pedal position sensor output signal ($P_{accel}$) that is output by the accelerator pedal position sensor 182. In some embodiments, the requested acceleration amount is determined to be proportional to the accelerator position sensor output signal ($P_{accel}$). In some embodiments, the requested acceleration amount is determined as a function of the accelerator position sensor output signal ($P_{accel}$). In some embodiments, the requested acceleration amount may be determined based on a requested torque, a requested acceleration amount, or based on one or more other sensed or calculated vehicle operation parameters. In some embodiments in which the hybrid vehicle 100 is an autonomous vehicle, the requested acceleration amount may be determined automatically by the electronic control unit 170 without input from a driver.

Still referring to FIG. 4 in conjunction with FIG. 1, at block 404, the machine readable instructions stored in the one or more memory modules 174, when executed by the one or more processors 172, cause the electronic control unit 170 to determine a vehicle speed. In some embodiments, the vehicle speed may be determined based on the vehicle speed (v) output signal provided by the vehicle speed sensor 186. In some embodiments, the vehicle speed may be determined as a function of the rotation speed of the output shaft 134 of the second motor-generator 130 ($N_{MG2}$) output signal provided by the second motor-generator rotational speed sensor 180. In other embodiments, the vehicle speed may be determined differently, such as when the vehicle speed is determined as a function of the wheel speed signals output by the plurality of wheel speed sensors 194, or the like.

Still referring to FIG. 4 in conjunction with FIG. 1, at block 406, the machine readable instructions stored in the one or more memory modules 174, when executed by the one or more processors 172, cause the electronic control unit 170 to provide a first amount of electrical energy from the primary electrical energy storage device 150 and the secondary electrical energy storage device 152 to the first motor-generator 120 in order to increase an engine speed of the internal combustion engine 110. In some embodiments, the machine readable instructions stored in the one or more memory modules 174, when executed by the one or more processors 172, cause the electronic control unit 170 to provide command signals to the electrical energy distribution device 160 in order to provide the first amount of electrical energy to the first motor-generator 120. In some embodiments that include the electrical energy distribution device 260 of FIG. 2, the machine readable instructions stored in the one or more memory modules 174, when executed by the one or more processors 172, cause the electronic control unit 170 to provide a first inverter command signal to the first inverter 220 and to provide a common DC-DC converter command signal to the common DC-DC converter 210 in order to provide the first amount of electrical energy to the first motor-generator 120. In some embodiments that include the electrical energy distribution device 360 of FIG. 3, the machine readable instructions stored in the one or more memory modules 174, when executed by the one or more processors 172, cause the electronic control unit 170 to provide a first inverter command signal to the first inverter 330 and to provide a first DC-DC converter command signal to the first DC-DC converter 310 and/or to provide a second DC-DC converter command signal to the second DC-DC converter 320 in order to provide the first amount of electrical energy to the first motor-generator 120.

In some embodiments, the first amount of electrical energy to provide to the first motor-generator 120 in order to increase an engine speed of the internal combustion engine 110 is determined based on the requested acceleration amount determined at block 402 and the vehicle speed determined at block 404. In some embodiments, the first amount of electrical energy is determined to be the amount of electrical energy required to increase the engine speed to a target engine speed within a threshold amount of time. In some embodiments, the first amount of electrical energy is determined based on a desired acceleration profile. In some embodiments, the first amount of electrical energy is determined based on one or more vehicle parameters or the requested acceleration amount and vehicle speed. In some embodiments, the first amount of electrical energy is determined as a quantity of current to be output to the electrical energy port 122 of the first motor-generator 120. Some embodiments may control the quantity of current output to the electrical energy port 122 of the first motor-generator 120 using a closed loop control scheme that utilizes a sensed current signal received by the electronic control unit 170 (e.g., a sensed current signal received from the first inverter current sensor 226 (FIG. 2) or a sensed current signal received from the first inverter current sensor 336 (FIG. 3)).

When the first amount of electrical energy is provided to the first motor-generator 120, a rotational speed of the output shaft 124 of the first motor-generator 120 is increased, which causes the plurality of planetary gears 144 and the carrier 146 that is mechanically coupled to the plurality of planetary gears 144 to rotate, which in turn causes the crankshaft 112 of the internal combustion engine 110 to rotate at an increased speed, thereby enabling the internal combustion engine 110 to generate power more quickly than if electrical energy was not provided to the first motor-generator 120.

Referring to FIG. 4 in conjunction with FIG. 1, at block 408, the machine readable instructions stored in the one or more memory modules 174, when executed by the one or more processors 172, cause the electronic control unit 170 to provide a second amount of electrical energy from the primary electrical energy storage device 150 and the secondary electrical energy storage device 152 to the second motor-generator 130 in order to increase a rotational speed of the plurality of drive wheels 102. In some embodiments, the machine readable instructions stored in the one or more memory modules 174, when executed by the one or more processors 172, cause the electronic control unit 170 to provide command signals to the electrical energy distribution device 160 in order to provide the second amount of electrical energy to the second motor-generator 130. In some embodiments that include the electrical energy distribution device 260 of FIG. 2, the machine readable instructions stored in the one or more memory modules 174, when executed by the one or more processors 172, cause the electronic control unit 170 to provide a second inverter command signal to the second inverter 230 and to provide a common DC-DC converter command signal to the common DC-DC converter 210 in order to provide the second amount of electrical energy to the second motor-generator 130. In some embodiments that include the electrical energy distribution device 360 of FIG. 3, the machine readable instructions stored in the one or more memory modules 174, when executed by the one or more processors 172, cause the electronic control unit 170 to provide a second inverter command signal to the second inverter 340 and to provide a first DC-DC converter command signal to the first DC-DC converter 310 and/or to provide a second DC-DC converter command signal to the second DC-DC converter 320 in order to provide the second amount of electrical energy to the first motor-generator 120.

In some embodiments, the second amount of electrical energy to provide to the second motor-generator 130 in order to increase the rotational speed of the plurality of drive wheels 102 (which are mechanically coupled to the output shaft 134 of the second motor-generator 130) is determined based on the requested acceleration amount determined at block 402 and the vehicle speed determined at block 404. In some embodiments, the second amount of electrical energy is determined to be the amount of electrical energy required to achieve a target wheel torque within a threshold amount of time. In some embodiments, the second amount of electrical energy is determined based on a desired acceleration profile. In some embodiments, the first amount of electrical energy is determined based on one or more vehicle parameters or than requested acceleration amount and vehicle speed. In some embodiments, the second amount of electrical energy is determined as a quantity of current to be output to the electrical energy port 132 of the second motor-generator 130. Some embodiments may control the quantity of current output to the electrical energy port 132 of the second motor-generator 130 using a closed loop control scheme that utilizes a sensed current signal received by the electronic control unit 170 (e.g., a sensed current signal received from the second inverter current sensor 236 (FIG. 2) or a sensed current signal received from the second inverter current sensor 346 (FIG. 3)).

When the second amount of electrical energy is provided to the second motor-generator 130, a rotational speed of the output shaft 134 of the second motor-generator 130 is increased, which causes a rotational speed of the plurality of drive wheels 102 (which are mechanically coupled to the output shaft 134 of the second motor-generator 130) to increase.

While the embodiments described herein distribute power from the primary electrical energy storage device 150 and the secondary electrical energy storage device 152 to the first motor-generator 120 and the second motor-generator 130 in order to achieve a desired balance between an increase in rotational speed of the internal combustion engine 110 and an increase in rotational speed of the plurality of drive wheels 102, other embodiments may distribute electrical energy from the primary electrical energy storage device 150 and the secondary electrical energy storage device 152 differently in order to accomplish the desired balance differently.

Hybrid vehicles that do not include the secondary electrical energy storage device 152 (i.e. hybrid vehicles that only include the primary electrical energy storage device 150) may not be able to adequately manage acceleration events in a desirable manner. For example, during an acceleration event, electrical energy may be needed to both raise a rotational speed of the internal combustion engine 110 (so that the internal combustion engine 110 will ultimately be able to provide sufficient power to help drive the plurality of drive wheels 102 to manage the acceleration event) and to immediately drive the plurality of drive wheels 102 in order to satisfy the requested acceleration event. Hybrid vehicles that do not include the secondary electrical energy storage device 152 may have insufficient electrical energy to effectuate both the required increase of the rotational speed of the internal combustion engine 110 while delivering sufficient electrical energy to the second motor-generator 130 to provide sufficient torque to the plurality of drive wheels 102. Such hybrid vehicles may need to be tuned to either focus on delivering electrical energy to the first motor-generator 120 in order to quickly increase the speed of the internal combustion engine 110 (which leaves insufficient electrical energy to be provided to the second motor-generator 130 for providing immediate drive torque to the plurality of drive wheels 102, which may result in an undesirable downshift-like feeling) or to focus on providing electrical energy to the second motor-generator 130 in order to provide adequate drive torque to the plurality of drive wheels 102 (which leaves insufficient electrical energy to be provided to the first motor-generator 120 for increasing the rotational speed of the internal combustion engine 110, which may result in an undesirable turbo-lag-like feeling). In contrast, embodiments that include both the primary electrical energy storage device 150 and the secondary electrical energy storage device 152 may be able to simultaneously provide sufficient electrical energy to the first motor-generator 120 in order to increase an engine speed of the internal combustion engine 110 at an acceptable rate while providing sufficient electrical energy to the second motor-generator 130 in order to increase a rotational speed of the plurality of drive wheels 102 at a sufficient rate to manage an acceleration event. While the secondary electrical energy storage device 152 is described herein as being included in hybrid vehicles, in other embodiments the secondary electrical energy storage device 152 may be included in a conventional vehicle or a turbocharged vehicle to help mitigate lag associated with accelerating or with transmission shifting.

Figure 5:
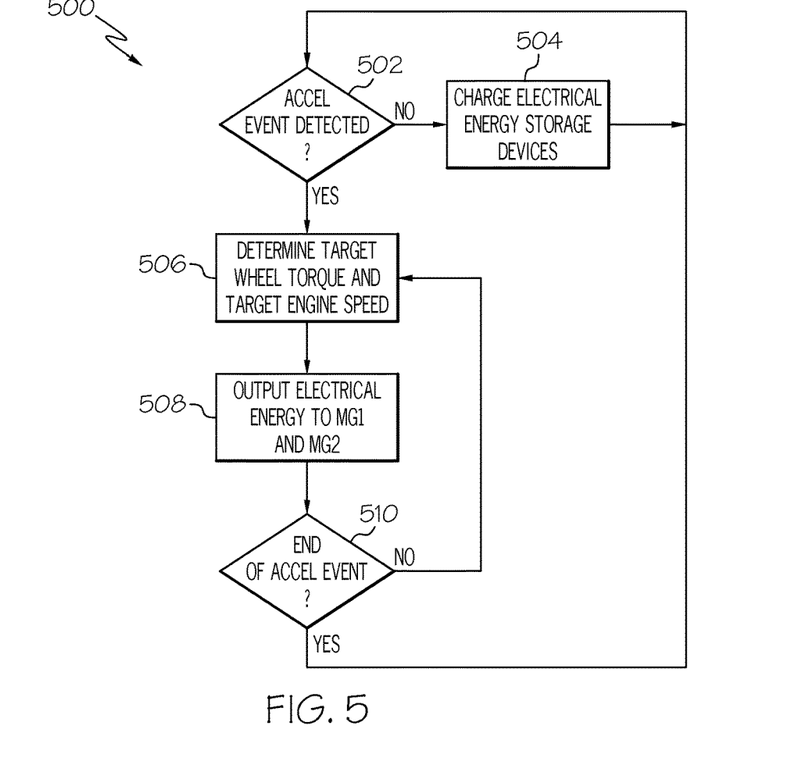
FIG. 5 schematically depicts a method for providing electrical energy to a first motor-generator and a second motor-generator, according to one or more embodiments shown and described herein.

Referring now to FIG. 5, in conjunction with FIG. 1, a method 500 is schematically depicted. Although the steps associated with the blocks of FIG. 5 will be described as being separate tasks, in other embodiments, the blocks may be combined or omitted. Further, while the steps associated with the blocks of FIG. 5 will be described as being performed in a particular order, in other embodiments, the steps may be performed in a different order.

At block 502, the machine readable instructions stored in the one or more memory modules 174, when executed by the one or more processors 172, cause the electronic control unit 170 to determine whether an acceleration event is detected. In some embodiments, the electronic control unit 170 determines whether an acceleration event is detected based on the accelerator pedal position sensor output signal ($P_{accel}$) that is output by the accelerator pedal position sensor 182. For example, some embodiments may determine that an acceleration event is detected when $P_{accel}$ changes by a threshold amount in a period of time. In some embodiments, the electronic control unit 170 determines whether an acceleration event is detected based on a requested torque, a requested acceleration amount, or based on one or more other sensed or calculated vehicle operation parameters. In some embodiments in which the hybrid vehicle 100 is an autonomous vehicle, the electronic control unit 170 determines whether an acceleration event is detected without input from a driver.

Still referring to FIG. 5 in conjunction with FIG. 1, if an acceleration event is not detected at block 502, the electronic control unit 170 charges the electrical energy storage devices at block 504. In particular, the first motor-generator 120 and the second motor-generator 130 operate in the generator mode and the electrical energy distribution device 160 converts alternating current received from the first motor-generator 120 and the second motor-generator 130 into a direct current output that may be channeled to the primary electrical energy storage device 150 and the secondary electrical energy storage device 152 for storage and later use.

Still referring to FIG. 5 in conjunction with FIG. 1, if an acceleration event is detected at block 502, the electronic control unit 170 determines a target wheel torque and a target engine speed at block 506. In some embodiments, the target wheel torque and target engine speed are determined as a function of vehicle acceleration or vehicle speed (each of which may be determined in the manner described above with respect to blocks 402 and 404). In some embodiments, the target wheel torque and target engine speed may be determined from a look-up table or determined by an algorithm that uses one or more calculated or sensed vehicle parameters as inputs and outputs the target wheel torque and/or the target engine speed. In some embodiments, the target wheel torque and target engine speed may be determined based on an acceleration profile stored in the one or more memory modules 174.

Still referring to FIG. 5 in conjunction with FIG. 1, at block 508, the machine readable instructions stored in the one or more memory modules 174, when executed by the one or more processors 172, cause the electronic control unit 170 to provide a first amount of electrical energy from the primary electrical energy storage device 150 and the secondary electrical energy storage device 152 to the first motor-generator 120 in order to increase an engine speed of the internal combustion engine 110 and to provide a second amount of electrical energy from the primary electrical energy storage device 150 and the secondary electrical energy storage device 154 to the second motor-generator 130 in order to increase the rotational speed of the plurality of drive wheels 102. In some embodiments, the machine readable instructions stored in the one or more memory modules 174, when executed by the one or more processors 172, cause the electronic control unit 170 to provide command signals to the electrical energy distribution device 160 in order to provide the first amount of electrical energy to the first motor-generator 120 and to provide the second amount of electrical energy to the second motor-generator. In some embodiments that include the electrical energy distribution device 260 of FIG. 2, the machine readable instructions stored in the one or more memory modules 174, when executed by the one or more processors 172, cause the electronic control unit 170 to provide a first inverter command signal to the first inverter 220, to provide a second inverter command signal to the second inverter 230, and to provide a common DC-DC converter command signal to the common DC-DC converter 210 in order to provide the first amount of electrical energy to the first motor-generator 120 and to provide the second amount of electrical energy to the second motor-generator 130. In some embodiments that include the electrical energy distribution device 360 of FIG. 3, the machine readable instructions stored in the one or more memory modules 174, when executed by the one or more processors 172, cause the electronic control unit 170 to provide a first inverter command signal to the first inverter 330, to provide a second inverter command signal to the second inverter 340, to provide a first DC-DC converter command signal to the first DC-DC converter 310, and to provide a second DC-DC converter command signal to the second DC-DC converter 320 in order to provide the first amount of electrical energy to the first motor-generator 120 and to provide the second amount of electrical energy to the second motor-generator 130.

In some embodiments, the first amount of electrical energy and the second amount of electrical energy are determined based on the target engine speed and target wheel torque determined at block 506. For example, in some embodiments, the first amount of electrical energy is determined to be the amount of electrical energy required to increase the engine speed to a target engine speed within a threshold amount of time. Similarly, in some embodiments, the second amount of electrical energy is determined to be the amount of electrical energy required to increase the wheel torque to a target wheel torque within a threshold amount of time. In some embodiments, the first amount of electrical energy and/or the second amount of electrical energy are determined based on a desired acceleration profile. In some embodiments, the first amount of electrical energy and/or the second amount of electrical energy are determined based on one or more vehicle parameters other than target engine speed and target wheel torque. In some embodiments, the first amount of electrical energy and the second amount of electrical energy are determined as quantities of current to be output to the electrical energy port 122 of the first motor-generator 120 and to the electrical energy port 132 of the second motor-generator 130, respectively.

When the first amount of electrical energy is provided to the first motor-generator 120, a rotational speed of the output shaft 124 of the first motor-generator 120 is increased, which causes the plurality of planetary gears 144 and the carrier 146 that is mechanically coupled to the plurality of planetary gears 144 to rotate, which in turn causes the crankshaft 112 of the internal combustion engine 110 to rotate at an increased speed, thereby enabling the internal combustion engine 110 to generate power more quickly than if electrical energy was not provided to the first motor-generator 120. When the second amount of electrical energy is provided to the second motor-generator 130, a rotational speed of the output shaft 134 of the second motor-generator 130 is increased, which causes a rotational speed of the plurality of drive wheels 102 (which are mechanically coupled to the output shaft 134 of the second motor-generator 130) to increase.

Still referring to FIG. 5 in conjunction with FIG. 1, at block 510, the machine readable instructions stored in the one or more memory modules 174, when executed by the one or more processors 172, cause the electronic control unit 170 to determine whether the acceleration event has ended. In some embodiments, the electronic control unit 170 determines that the acceleration event has ended based on the accelerator pedal position sensor $P_{accel}$. In some embodiments, the electronic control unit 170 determines that the acceleration event has ended when a sensed or calculated wheel torque equals the target wheel torque or when a sensed or calculated engine speed equals the target engine speed. In some embodiments, the electronic control unit 170 determines that the acceleration event has ended based on the state of charge of the primary electrical energy storage device 150 ($SOC_p$) and/or the state of charge of the secondary electrical energy storage device 152 ($SOC_s$), such as when the electronic control unit 170 determines that the acceleration event has ended when the state of charge of the primary electrical energy storage device 150 ($SOC_p$) is less than a threshold value and/or the state of charge of the secondary electrical energy storage device 152 ($SOC_s$) is less than a threshold value.

Still referring to FIG. 5, the electronic control unit 170 determines that the acceleration event has ended at block 510, the method 500 returns to block 502. If the electronic control unit 170 determines that the acceleration event has not ended at bock 510, the method 500 proceeds to block 506.

It should be understood that the hybrid vehicles described herein are able to simultaneously provide sufficient electrical energy to a first motor-generator in order to increase an engine speed of an internal combustion engine at an acceptable rate while providing sufficient electrical energy to a second motor-generator in order to increase a rotational speed of the plurality of drive wheels at a sufficient rate to manage an acceleration event. Furthermore, the hybrid vehicles described herein are able to adjust the amount of electrical energy distributed from the primary electrical energy storage device and the secondary electrical energy storage device to the first motor-generator and the second motor-generator based on a requested acceleration amount and a vehicle speed, thereby allowing the hybrid vehicle to flexibly tailor the distribution of electrical energy used to increase a rotational speed of the internal combustion engine and used to increase a rotational speed of the plurality of drive wheels based on particular requested acceleration and speed conditions. Furthermore, the secondary electrical energy storage devices described herein permit the distribution of additional electrical energy to the first motor-generator and the second motor-generator, allowing the hybrid vehicle to achieve a desired engine speed faster and with a smoother acceleration profile as compared to hybrid vehicles that do not include the secondary electrical energy storage device, which would have less available electrical energy for distribution to the first motor-generator and the second motor-generator, thereby resulting in a less smooth acceleration profile.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A hybrid vehicle comprising:
   one or more processors;
   one or more memory modules communicatively coupled to the one or more processors;

an internal combustion engine comprising a crankshaft;
a plurality of drive wheels;
a first motor-generator comprising an output shaft, wherein the output shaft of the first motor-generator is mechanically coupled to the crankshaft of the internal combustion engine;
a second motor-generator comprising an output shaft, wherein the output shaft of the second motor-generator is mechanically coupled to the plurality of drive wheels;
a primary electrical energy storage device electrically coupled to the first motor-generator and the second motor-generator such that the primary electrical energy storage device can provide electrical energy to the first motor-generator and the second motor-generator;
a secondary electrical energy storage device electrically coupled to the first motor-generator and the second motor-generator such that the secondary electrical energy storage device can provide electrical energy to the first motor-generator and the second motor-generator;
a first inverter electrically coupled to the first motor-generator, wherein the first inverter is communicatively coupled to the one or more processors; and
a second inverter electrically coupled to the second motor-generator, wherein the second inverter is communicatively coupled to the one or more processors,
machine readable instructions stored in the one or more memory modules that cause the hybrid vehicle to perform at least the following when executed by the one or more processors:
 provide a first amount of electrical energy from the primary electrical energy storage device and the secondary electrical energy storage device to the first motor-generator in order to increase an engine speed of the internal combustion engine; and
 provide a second amount of electrical energy from the primary electrical energy storage device and the secondary electrical energy storage device to the second motor-generator in order to increase a rotational speed of the plurality of drive wheels, wherein the first amount of electrical energy is provided to the first motor-generator at the same time as the second amount of electrical energy is provided to the second motor-generator;
 provide a first inverter command signal to the first inverter in order to provide the first amount of electrical energy from the primary electrical energy storage device and the secondary electrical energy storage device to the first motor-generator; and
 provide a second inverter command signal to the second inverter in order to provide the second amount of electrical energy from the primary electrical energy storage device and the secondary electrical energy storage device to the second motor-generator,
 wherein the first inverter command signal is determined based on current sensed by a first inverter current sensor coupled to the first inverter, and the second inverter command signal is determined based on current sensed by a second inverter current sensor coupled to the second inverter,
 wherein the first amount of electrical energy is determined based on a predetermined acceleration rate of the engine speed.

2. The hybrid vehicle of claim 1, further comprising:
a common DC-DC converter electrically coupled to the primary electrical energy storage device and the secondary electrical energy storage device and electrically coupled to the first inverter and the second inverter, and wherein the common DC-DC converter is communicatively coupled to the one or more processors;
wherein the machine readable instructions, when executed by the one or more processors, cause the hybrid vehicle to:
 provide a common DC-DC converter command signal to the common DC-DC converter in order to provide the first amount of electrical energy and the second amount of electrical energy.

3. The hybrid vehicle of claim 1, further comprising:
a first DC-DC converter electrically coupled to the primary electrical energy storage device and electrically coupled to the first inverter and the second inverter, and wherein the first DC-DC converter is communicatively coupled to the one or more processors; and
a second DC-DC converter electrically coupled to the secondary electrical energy storage device and electrically coupled to the first inverter and the second inverter, and wherein the second DC-DC converter is communicatively coupled to the one or more processors;
wherein the machine readable instructions, when executed by the one or more processors, cause the hybrid vehicle to:
 provide a first DC-DC converter command signal to the first DC-DC converter and provide a second DC-DC converter command signal to the second DC-DC converter in order to provide the first amount of electrical energy and the second amount of electrical energy.

4. The hybrid vehicle of claim 1, further comprising:
an accelerator pedal position sensor communicatively coupled to the one or more processors and outputting an accelerator pedal position signal indicative of a position of an accelerator pedal;
wherein the machine readable instructions, when executed by the one or more processors, cause the hybrid vehicle to:
 determine a requested acceleration amount based on the accelerator pedal position signal.

5. The hybrid vehicle of claim 4, wherein the machine readable instructions, when executed by the one or more processors, cause the hybrid vehicle to:
 determine a target engine speed based on the requested acceleration amount and a vehicle speed, wherein the first amount of electrical energy is based on the target engine speed; and
 determine a target wheel torque based on the requested acceleration amount and the vehicle speed, wherein the second amount of electrical energy is based on the target wheel torque.

6. The hybrid vehicle of claim 1, wherein:
the primary electrical energy storage device includes a battery; and
the secondary electrical energy storage device includes a capacitor.

7. The hybrid vehicle of claim 1, wherein the machine readable instructions, when executed by the one or more processors, cause the hybrid vehicle to:
 determine a requested acceleration amount; and
 determine a vehicle speed, wherein the first amount of electrical energy is based on the requested acceleration amount and the vehicle speed, and wherein the second amount of electrical energy is based on the requested acceleration amount and the vehicle speed.

8. The hybrid vehicle of claim 1, wherein the first amount of electrical energy is determined based on a predetermined acceleration profile.

\* \* \* \* \*